June 7, 1960  D. L. MILLER  2,939,562

DENTAL TYPE OF OVERRUNNING CLUTCH TRANSMISSION

Filed June 12, 1957

INVENTOR.
Donald L. Miller
BY
Clinton L. James
ATTORNEY

WITNESS:
Esther M. Stockton

United States Patent Office 2,939,562
Patented June 7, 1960

2,939,562

DENTAL TYPE OF OVERRUNNING CLUTCH TRANSMISSION

Donald L. Miller, Horseheads, N.Y., assignor to Bendix Aviation Corporation, Elmira Heights, N.Y., a corporation of Delaware Filed June 12, 1957, Ser. No. 665,231

7 Claims. (Cl. 192—104)

The present invention relates to a dental type of overrunning clutch transmission, and more particularly to a self-tightening dental clutch with centrifugal separation of the clutch members during overrunning.

Self-tightening dental overrunning clutch connections such as shown in applicant's prior Patent 2,554,445, issued May 22, 1951, have been found to be very satisfactory in connection with starter gearing for internal combustion engines as there illustrated. It is an object of the present invention to incorporate the principles of this patented structure, with modifications and adaptations, in overrunning clutch devices for general commercial use.

It is another object to provide such a device which engages positively under load, disengages promptly and overruns freely and quietly.

It is another object to provide such a device which has a high torque capacity in relation to the sizes of the component parts.

It is another object to provide such a device which avoids concentrations of high pressure on localized areas of the torque transmitting elements.

It is another object to provide such a device incorporating centrifugal means for separating the clutch members during overrun above a predetermined speed, which centrifugal means is free from frictional drag during such overrunning condition.

Figure 1:
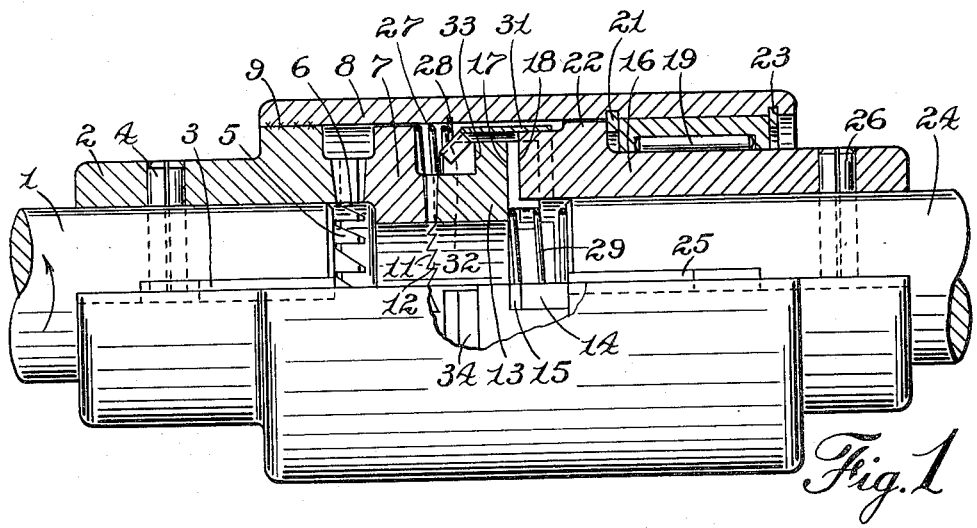
Figure 2:
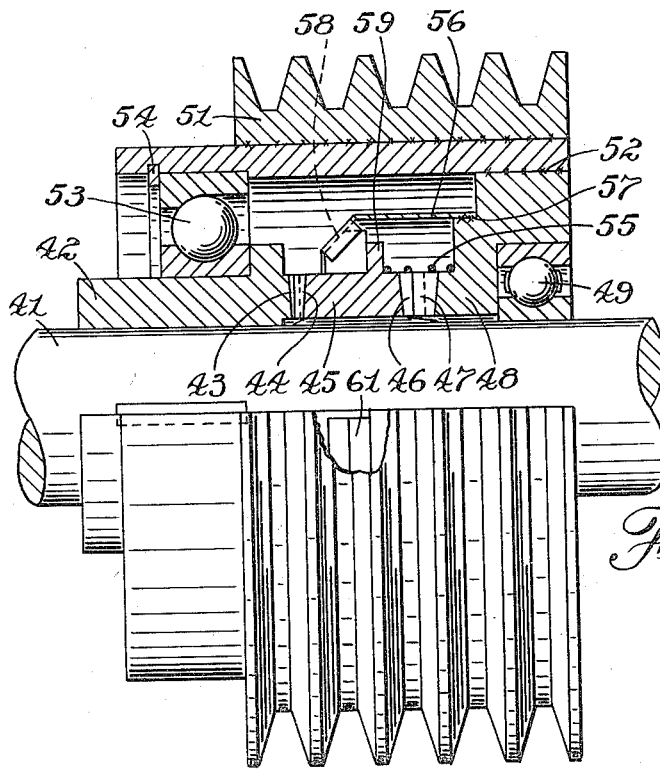

Further objects and advantages will be apparent from the following description taken in connection with the accompanying drawing in which:

Fig. 1 is a side elevation, partly broken away and in section, showing a preferred embodiment of the invention as employed to couple coaxial shafts; and Fig. 2 is a similar view showing applicant's novel transmission used to connect a shaft to a rotatable member mounted thereon.

In Fig. 1 of the drawing there is illustrated an input member in the form of a drive shaft 1 on which a driving coupling member 2 is fixedly mounted as by means of a key 3 and pin 4. The coupling member 2 is provided with axially inclined projections 5 adapted to mate with similar projections 6 on an intermediate transmission and driving clutch member 7 which is rotatably and slidably mounted within a barrel member 8 fixedly mounted on the coupling member 2 as indicated by 9. Transmission member 7 is formed with overrunning clutch teeth 11 adapted to engage similar clutch teeth 12 in a driven overrunning clutch member 13. The driven clutch member is formed with slots 15 adapted to slidably receive axially extending projections 14 formed on the end of a driven sleeve element 16 whereby the driven clutch member 13 and the sleeve 16 are slidably coupled for rotation in unison. The telescoping movement of the driven clutch member 13 is limited by abutment of the surface 17 of the clutch member against the surface 18 of the sleeve 16.

Sleeve 16 has a swivel connection with the barrel member 8 and consequently with the driving coupling member 2, by means of a bearing 19 and a split lock ring 21 seated in the interior of the barrel 8 against a flange 22 of said sleeve. Bearing 19 is retained in the sleeve by a second lock ring 23. A driven shaft 24 is rigidly mounted in the sleeve 16 as by means of a key 25 and pin 26.

Torque transmitted through the inclined projections 5, 6 tends to wedge the intermediate transmission member 7 away from the driving coupling member 2, pressing the transmission and driving clutch member against the driven clutch member 13. Movement of the latter responsive to such pressure is so limited by the engagement of the surfaces 17, 18 of the driven clutch member and sleeve 16 that the coupling projections 5, 6 are not permitted to disengage.

Means for yieldingly urging the transmission member 7 toward the driving coupling member 2 is provided in the form of a spring 27 located in the barrel member 8 by means of a lock ring 28, and bearing against the transmission member 7. Means normally urging the clutch teeth 11, 12 into engagement is provided in the form of a spring 29 located between the driven clutch member 13 and the end of the driven shaft 24.

Centrifugal means are provided for holding the clutch teeth 11, 12 out of engagement to permit the driven elements to rotate freely while overrunning above a predetermined speed. For this purpose a collar 31 is fixedly mounted on the driven sleeve 16 and is provided with an inwardly inclined flange surface 32 adjacent a radial flange 33 on the driven clutch member 13. Weight members 34 are located between the flanges 32 and 33 and are arranged to move outwardly, compressing the clutch spring 29 and drawing the driven clutch member 13 against the end of the driven sleeve 16 when these parts overrun above a predetermined speed.

In operation, starting with the parts in their normal or idle positions as shown in Fig. 1, rotation of the driving shaft 1 in the direction of the arrow is transmitted through the coupling member 2 and its projections 5 to the intermediate transmission member 7, which is thereby wedged against the driven clutch member 13, and the latter pressed against the end of the sleeve 16. The overrunning clutch teeth 11, 12 are thus pressed tightly together. Rotation is then transmitted from the driven clutch member 13 through the projections 15 to the sleeve 16 and shaft 24.

When the driven shaft 24 overruns, the load is relieved from the coupling projections 5, 6 which permits the clutch member 13 to overrun the transmission member, and allows spring 27 to slide transmission member 7 into full mesh with the driving coupling member 2. As soon as the rotation of the overrunning parts reaches the predetermined speed, the weight members 34 move outwardly by centrifugal force, overcoming the clutch spring 29 and holding the driven clutch member 13 against the sleeve 16 thus keeping the clutch teeth 12 separated from the clutch teeth 11. Overrunning then continues without attrition or friction between the members of the overrunning clutch.

In Fig. 2 of the drawing a driving shaft 41 has fixedly mounted thereon a driving clutch member 42 having overrunning clutch teeth 43 adapted to engage similar teeth 44 on an intermediate transmission and driven clutch member 45 which is slidably journalled on the shaft 41. The transmission member 45 is formed with axially inclined projections 46 mating with similar projections 47 on a driven coupling member 48 which is rotatably mounted on the shaft 41 by means of a bearing 49.

A driven element here shown in a form of a pulley 51 is fixedly mounted, as indicated at 52, on the driven coupling member 48, and is rotatably mounted on the driving clutch member 42 by means of a thrust bearing 53, Bearing 53 is located in the driven element 51 by means of a lock ring 54 and cooperates with the bearing 49 to prevent axial movement of the driven element.

A spring 55 located between the transmission member 45 and driven coupling member 48 tends to separate these members and thus cause engagement of the overrunning clutch teeth 43, 44.

A collar 56 is rigidly mounted on the driven coupling member 48 as indicated at 57 and is provided with an inwardly inclined flange 58 which is in proximity to a radial flange 59 on the transmission member 45. Centrifugal weight members 61 located between the flanges 58, 59 are arranged to move outwardly when overrunning occurs above a predetermined speed and thereby overcome the spring 55 and draw the transmission member 45 out of engagement with the clutch member 42.

In the operation of this embodiment of the invention, rotation of the driving shaft 41 is transmitted through the driving clutch member 42 to the transmission member 45, which in turn rotates the driven coupling member 48 through the inclined projections 46, 47, the wedging effect of the projections pressing the overrunning clutch wheel 43, 44 firmly together.

When the driven element 51 overruns, the relief of the load on the coupling projections 46, 47 permits the overrunning clutch teeth 44 to disengage themselves from the clutch teeth 43, and when the speed of overrun reaches a predetermined point the weights 61 move out and draw the transmission member 45 out of contact with the driving clutch member 42, after which the driven element is free to overrun without any frictional drag of the clutch parts.

Although certain structure has been shown and described in detail it will be understood that changes may be made in the design and arrangement of the parts without departing from the spirit of the invention.

I claim:

1. A self-tightening overrunning clutch connection comprising a driving clutch member, a driven clutch member rotatably and slidably mounted for movement into and out of engagement with the driving clutch member, said clutch members having cooperating means for the transmission of torque from the driving clutch member to the driven clutch member when said members are in operative engagement and permitting the driven clutch member to overrun when said clutch members are disengaged, means responsive to the transmission of torque therethrough for wedging said clutch members together, a collar surrounding the driven clutch member and connected to rotate therewith with freedom for relative longitudinal movement, said collar and driven clutch member having flanges, one of which is radial, and the other is axially inclined thereto, and centrifugal means located between and cooperating with said flanges to draw the drive clutch member out of engagement with the driving clutch member when the driven clutch member overruns above a predetermined speed.

2. An overrunning clutch connection as set forth in claim 1 including further yielding means urging the driven clutch member into engagement with the driving clutch member, said wedging means including an inclined driving connection forcing the driving clutch member against the driven clutch member, and an abutment positively limiting the movement of the driven clutch member away from the driving clutch member.

3. In an overrunning clutch connection a driving element, a driving coupling member fixed thereto having a plurality of axially inclined torque-transmitting projections, an intermediate transmission and driving clutch member mounted for axial movement relative to the driving coupling member, having coupling projections mating with those of the driving coupling member and having overrunning clutch teeth, a driven clutch member mounted for axial movement into and out of engagement with the intermediate transmission member, a driven element having a swivel connection with the driving element and non-rotatably connected with the driven clutch member with freedom for limited relative axial movement, a collar fixed to the driven element surrounding the driven clutch member, said collar and driven clutch member having flanges, one of which is radial, and the other is axially inclined thereto, and centrifugal means located between and cooperating with said flanges to draw the driven clutch member out of engagement with the driving clutch member when the driven clutch member overruns above a predetermined speed.

4. An overrunning clutch transmission as set forth in claim 3 including further yielding means urging the intermediate transmission member toward the driving coupling member, and yielding means urging the driven clutch member toward the intermediate transmission member, said connection between the driven clutch member and the driven element including an abutment on the driven element so limiting the axial movement of the driven clutch member as to prevent disengagement of the inclined torque-transmitting projections of the driving coupling member and the intermediate transmission member.

5. In an overrunning clutch transmission a driving shaft, a driving overrunning clutch member fixed thereon, a driven overrunning clutch and driving coupling member slidably journalled on the shaft, a driven coupling member rotatably mounted on the shaft having an inclined torque-transmission connection with the driving coupling member operative under load to wedge the overrunning clutch closed, a collar fixed to the driven coupling member surrounding the driving coupling member, and centrifugal means cooperating with the collar and driving coupling member to draw the latter toward the driven coupling member responsive to overrun of the driven coupling member above a predetermined speed.

6. An overrunning clutch connection as set forth in claim 5 including further a driven element fixedly mounted on the driven coupling member and rotatably but non-slidably mounted on the driving clutch member.

7. An overrunning clutch connection as set forth in claim 5 including further yielding means urging the coupling members apart to thereby close the overrunning clutch.

References Cited in the file of this patent

UNITED STATES PATENTS

| | | |
|---|---|---|
| 2,538,300 | Digby | Jan. 16, 1951 |
| 2,554,445 | Miller | May 22, 1951 |
| 2,561,977 | Digby | July 24, 1951 |
| 2,720,299 | Niemela | Oct. 11, 1955 |